United States Patent
Ichinokawa et al.

(10) Patent No.: US 9,417,088 B2
(45) Date of Patent: *Aug. 16, 2016

(54) NAVIGATION SYSTEM AND METHOD TO SCROLL TO USER SELECTED POINT OF INTERESTS (POIS)

(71) Applicant: Honda Motor Co., Ltd., Minato-ku, Tokyo (JP)

(72) Inventors: Jumpei Ichinokawa, Rolling Hills Estate, CA (US); Maja Kurciska, Sherman Oaks, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/849,387

(22) Filed: Sep. 9, 2015

(65) Prior Publication Data

US 2016/0146626 A1    May 26, 2016

Related U.S. Application Data

(63) Continuation of application No. 14/550,591, filed on Nov. 21, 2014.

(51) Int. Cl.
   *G01C 21/36* (2006.01)
(52) U.S. Cl.
   CPC ................... *G01C 21/367* (2013.01)
(58) Field of Classification Search
   CPC .................. G01C 21/36; G08G 1/09
   See application file for complete search history.

(56) References Cited

U.S. PATENT DOCUMENTS

| | | | |
|---|---|---|---|
| 5,059,970 A * | 10/1991 | Raubenheimer | G09B 29/106 340/995.26 |
| 5,539,429 A | 7/1996 | Yano et al. | |
| 6,121,900 A | 9/2000 | Takishita | |
| 6,202,026 B1 | 3/2001 | Nimura et al. | |
| 6,240,361 B1 | 5/2001 | Ise et al. | |
| 6,415,224 B1 | 7/2002 | Wako et al. | |
| 6,640,185 B2 | 10/2003 | Yokota et al. | |
| 6,836,723 B2 | 12/2004 | De Silva | |
| 6,898,523 B2 | 5/2005 | Cochlovius et al. | |
| 6,983,203 B1 * | 1/2006 | Wako | G01C 21/3682 340/988 |
| 7,042,370 B2 | 5/2006 | Morie | |
| 7,126,579 B2 | 10/2006 | Ritter | |
| 7,469,381 B2 | 12/2008 | Ording | |
| 7,490,004 B2 | 2/2009 | Kimura | |
| 7,515,142 B2 | 4/2009 | Park | |
| 7,814,435 B2 * | 10/2010 | Wako | G01C 21/3682 715/835 |

(Continued)

FOREIGN PATENT DOCUMENTS

| | | |
|---|---|---|
| EP | 2077485 | 7/2009 |
| EP | 2126678 | 12/2009 |

(Continued)

*Primary Examiner* — Thomas Tarcza
*Assistant Examiner* — Alex C Dunn
(74) *Attorney, Agent, or Firm* — Arent Fox LLP (57) ABSTRACT

A navigation system has at least one processor. A memory is coupled to the processor. The memory stores program instructions that when executed by the processor, causes the processor to: display a map; display a cursor showing a present location of a vehicle on the map; display a menu screen to enter user selected point of interest (POI) search criteria; display markings on the map, wherein each marking corresponds to a POI matching the user selected POI search criteria; move the map to a user selected marking; and center the map on the user selected marking.

19 Claims, 6 Drawing Sheets

(56) References Cited

U.S. PATENT DOCUMENTS

| | | | |
|---|---|---|---|
| 7,913,192 B2 * | 3/2011 | Dicke | G01C 21/3667 340/995.14 |
| 8,050,858 B2 | 11/2011 | Mashitani et al. | |
| 8,106,883 B2 | 1/2012 | Ahn | |
| 8,234,060 B2 | 7/2012 | Uotani et al. | |
| 8,253,704 B2 | 8/2012 | Jang | |
| 8,260,364 B2 | 9/2012 | Kim | |
| 8,606,519 B2 | 12/2013 | Waeller | |
| 8,700,309 B2 | 4/2014 | Mashitani et al. | |
| 2004/0204833 A1 * | 10/2004 | Yokota | G01C 21/3611 701/455 |
| 2009/0088964 A1 | 4/2009 | Schaaf et al. | |
| 2009/0167695 A1 | 7/2009 | Griffin et al. | |
| 2009/0271745 A1 * | 10/2009 | Sakamoto | G01C 21/367 715/859 |
| 2010/0122214 A1 | 5/2010 | Sengoku | |
| 2013/0031507 A1 | 1/2013 | George | |
| 2013/0044140 A1 | 2/2013 | Kim et al. | |
| 2013/0057487 A1 | 3/2013 | Yamanaka et al. | |
| 2013/0076674 A1 | 3/2013 | Lee | |
| 2013/0181920 A1 | 7/2013 | Lira | |
| 2013/0211719 A1 * | 8/2013 | Boschker | G01C 21/3484 701/533 |
| 2013/0268892 A1 | 10/2013 | Schaaf et al. | |

FOREIGN PATENT DOCUMENTS

| | | |
|---|---|---|
| EP | 2184917 | 5/2010 |
| EP | 2560086 | 2/2013 |
| EP | 2573666 | 3/2013 |
| GB | 2477528 | 8/2011 |
| JP | 9-145398 | 6/1997 |
| JP | 2000-172989 | 6/2000 |
| JP | 2003-186392 | 7/2003 |
| JP | 2004-093156 | 3/2004 |
| JP | 2009-086482 | 4/2009 |
| JP | 2011-053101 | 3/2011 |
| JP | 2013-097411 | 5/2013 |
| WO | 2011/044730 | 4/2011 |

* cited by examiner

NAVIGATION SYSTEM AND METHOD TO SCROLL TO USER SELECTED POINT OF INTERESTS (POIS)

CROSS-REFERENCE TO RELATED APPLICATION

This application is a continuation application of U.S. patent application Ser. No. 14/550,591, filed Nov. 21, 2014. The disclosure of the priority application is incorporated its entirety herein by reference.

FIELD

The present application generally relates to a vehicle navigation system, and, more particularly, to a vehicle navigation system that displays different points of interest (POIs) on a map that meet defined search criteria and allows the user to move to a desired POI while providing details of the selected POI.

BACKGROUND

Many vehicles may now be equipped with navigations systems. Vehicle navigation systems may be used to search for and calculate a route from a current location of the vehicle to a desired destination. Typical vehicle navigation systems may be configured to allow a user to enter a name or address of the desired destination. The vehicle navigation system may calculate a route from a current location of the vehicle to the desired destination and provide turn-by-turn navigation directions to the driver via text, speech, or other communications avenues. The vehicle navigation may show a map in graphical format on a display. The map may show the present location of the vehicle as the vehicle moves along a highlighted path to the desired destination. The display may also show the textual directions.

Vehicle navigation systems may allow a user to perform a search for different types of points of interests (POIs) that may be located near the current location of the vehicle. The vehicle navigation system may allow the user to locate different POIs such as nearest gas station, restaurants, parks, shopping centers and other destination types and then select one of the POIs as the destination.

In present vehicle navigation systems, when the user performs a search for different types of POIs, a list may be displayed showing POIs that match the user's search criteria. For example, if a user were to enter coffee shops, a list of coffee shops located near the vehicle may be displayed. Alternatively, or in addition to the list of POIs matching the user's search criteria, a plurality of markings and/or pins may be displayed on the map indicating the location of POIs on the map. Thus, in the above example, the map may have a plurality of pins indicating the location of the coffee shops located near the vehicle. However, limited to no information is provided about each pin. Thus, information such as the name of the POT related to each pin, address of the POI related to each pin, and other POI related data is not shown.

In present vehicle navigation systems, the vehicle location may be represented as a cursor and located in a center area of the display. In general, one cannot move the location of the cursor, as the cursor represents the current location of the vehicle. Even when the vehicle is moving, the cursor generally stays in the middle of the display and the graphical representation of the map continuously updates as the vehicle moves. Thus, if a plurality of pins is displayed on the map indicating the location of user defined POIs, the user is not able to move/scroll to the different pin locations displayed on the map.

Therefore, it would be desirable to provide a system and method that overcome the above identified concerns, as well as additional challenges which will become apparent from the disclosure set forth below.

SUMMARY

This summary is provided to introduce a selection of concepts in a simplified form that are further described below in the DESCRIPTION OF THE APPLICATION. This summary is not intended to identify key features of the claimed subject matter, nor is it intended to be used as an aid in determining the scope of the claimed subject matter.

In accordance with one aspect of the present application, a navigation system is disclosed. The navigation system has at least one processor. A memory is coupled to the processor. The memory stores program instructions that when executed by the processor, causes the processor to: display a map; display a cursor showing a present location of a vehicle on the map; display a menu screen to enter user selected point of interest (POI) search criteria; display markings on the map, wherein each marking corresponds to a POI matching the user selected POI search criteria; move the map to a user selected marking; and center the map on the user selected marking.

In accordance with one aspect of the present application, a method of displaying point of interests (POIs) on a navigation system is disclosed. The method comprises: displaying a map; displaying a menu screen to enter user selected POI search criteria; displaying markings on the map corresponding to a POI matching the user selected POI search criteria; moving the map to a user selected marking; and centering the map on the user selected marking.

In accordance with one aspect of the present application, a navigation system is disclosed. The navigation system has at least one processor. A memory is coupled to the processor. The memory stores program instructions that when executed by the processor, causes the processor to: display a map; display a cursor showing a present location of a vehicle on the map; display a menu screen to enter user selected POI search criteria; display a POI list showing POIs matching the user selected POI search criteria, the POI list displays the POIs in order based on a distance from the present location of the vehicle to each respective POI; display markings on the map corresponding to a POI matching the user selected POI search criteria; moving the map to a user selected marking; centering the map on the user selected marking; and display data in a text box proximate the user selected marking showing information related to the user selected marking.

BRIEF DESCRIPTION OF THE DRAWINGS

Embodiments of the disclosure will become more fully understood from the detailed description and the accompanying drawings, wherein.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Figure 1:
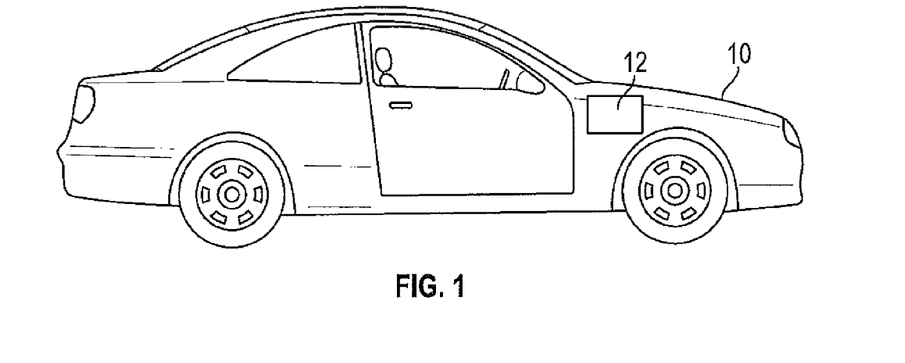
FIG. 1 is a side view of a vehicle implementing an exemplary navigation system having a scroll feature to move a cursor to a desired point and to search for points of interest near the desired point in accordance with one aspect of the present application.

Referring to FIG. 1, an exemplary vehicle 10 may be seen. The vehicle 10 may be equipped with a navigation system 12. The navigation system 12 may be used to provide directional guidance from a present location of the vehicle 10 to a desired location. The navigation system 12 may be configured to display a map showing a plurality of marking and/or pins (hereinafter pins) indicating different point of interests (POIs) that matches a user's search criteria and to allow the user to move to a desired pin and display details of the POI related to the desired pin.

Figure 2:
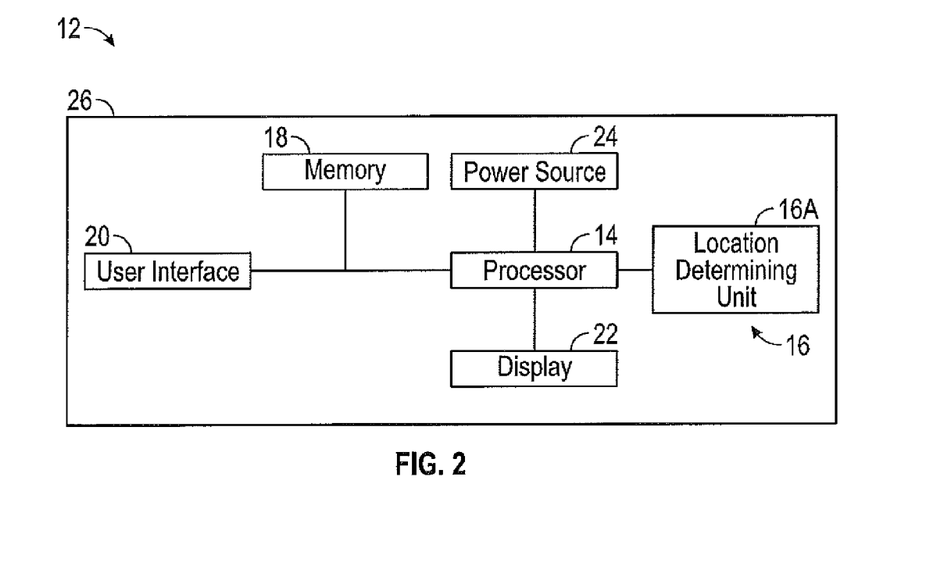
FIG. 2 is a simplified functional block diagram of the exemplary navigation system depicted in FIG. 1 in accordance with one aspect of the present application.

Referring now to FIG. 2, in accordance with one embodiment, the navigation system 12 may have a processor 14, a location determining unit 16, a memory 18, a user interface 20, a display 22 and a power source 24. Each of the above mentioned components of the navigation system 12 may be placed within a housing 26. The processor 14 may be coupled to the user interface 20, location determining unit 16, memory 18, and display 22, through wired or wireless connections to enable information to be exchanged between the various components. All or some of the components of the navigation system 12 may be powered via the power source 24.

The processor 14 may be used to control the various functions of the navigation system 12. The processor 14 may be implemented in hardware, software or a combination thereof. The processor 14 may store a computer program or other programming instructions associated with the memory 18 to control the operation of navigation system 12. The data structures and code within the software in which the present disclosure may be implemented, may be stored on a non-transitory computer-readable storage. The non-transitory computer-readable storage may be any device or medium that may store code and/or data for use by a computer system. The non-transitory computer-readable storage medium may include, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed. The processor 14 may comprise various computing elements, such as integrated circuits, microcontrollers, microprocessors, programmable logic devices, etc, alone or in combination to perform the operations described herein.

When the navigation system 12 is active, the processor 14 may determine a current location of the vehicle 10. The processor 14 may receive location data from the location determining unit 16. In accordance with one embodiment, the location determining unit 16 may be a Global Positioning Satellite (GPS) device 16A. The GPS device 16A may calculate the current location of the vehicle 10 by timing signals sent by GPS satellites. Each GPS satellite may continually transmits message signals that may include the time the message was transmitted and GPS satellite position at the time the message signal was transmission. The GPS device 16A may use the message signals received to determine a transit time of each message signal and computes the distance to each GPS satellite. These distances and satellite locations may be used to compute the location of the GPS device 16A and thus the present location of the vehicle 10. The above is given as one example. The processor 14 may determine a current location of the vehicle 10 in other manners.

The memory 18 may be coupled to the processor 14 as well as other components of the navigation system 12. The memory 18 may be used to store various data utilized by the processor 14 and or other components of the navigation system 12. The memory 18 may include removable and non-removable memory elements such as RAM, ROM, flash, magnetic, optical, and/or other conventional memory elements. The above listing is given as an example and should not be seen in a limiting manner.

The memory 18 may be used to store programming data for instructing the processor 14 or other components of the navigation system 12 to perform certain steps as will be described below. The memory 18 may also store various geographical representations of maps and navigation data, as well as data related to POIs and other related data.

The user interface 20 may be coupled to the processor 14 as well as other components of the navigation system 12. The user interface 20 may be used to enter information into the navigation system 12. The user interface 20 may be buttons, switches, keyboard, trackball, scroll wheel or similar device used to enter data. In accordance with one embodiment, the display unit 22 may show an alphanumeric keyboard or other input mechanisms and the user interface 20 may be used to select and enter a desired letter, number and/or other input command. Alternatively, the display unit 22 may be a touch screen display thereby functioning as a display unit 22 and the user interface 20.

The display 22 may be coupled to the processor 14 as well as other components of the navigation system 12. The display 22 may be used to show graphical representations of maps, routes, POIs, and other data as will be detailed below. The display 22 may be used to show an alphanumeric keyboard and/or other input mechanism to be used with or as the user interface 20. The display 22 may be a Cathode Ray Tube (CRT), Liquid Crystal Display (LCD) or display types.

The power source 24 may be provided to supply power to the various components of the navigation system 12. The power source 24 may be used to directly or indirectly power the processor 14, the location determining unit 16, memory 18, user interface 20 and/or display 22. The power source 24 may be batteries, an adapter for running off of power supplied by the vehicle 10 or power supply devices.

Based on the current location identified, the processor 14 may display a graphical representation of a map showing the current location of the vehicle 10 on the display unit 22. The processor 14 may obtain map data from the memory 18. Alternatively, the processor 14 may download map data via the location determining unit 16 (i.e., the GPS device 16A). The graphical representation of the map shown on the display 22 may be a two dimensional representation, a three dimensional representation, a satellite image representation, or other graphical representations.

Figure 3:
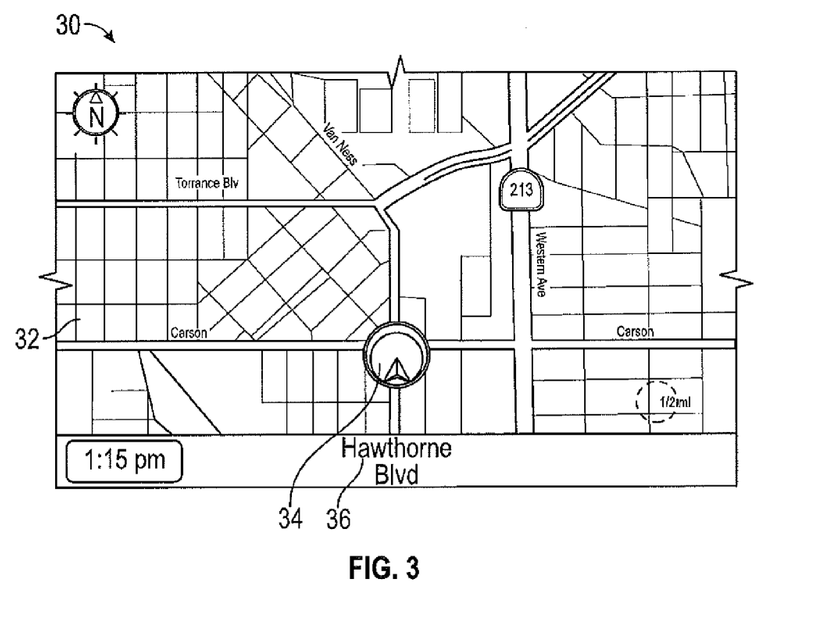
FIG. 3 shows one embodiment of an illustrative screen view generated by the exemplary navigation system depicted in FIG. 1 showing a Vehicle Position (VP) cursor in accordance with one aspect of the present application.

Referring now to FIGS. 1-8, operation of the navigation system 12 may be described. When the navigation system 12 is activated, the navigation system 12 may identify a current location of the vehicle 10. An initial screen view 30 may be generated as shown in FIG. 3. In general, the initial screen view 30 may show a graphical representation of a map 32. A vehicle position (VP) cursor 34 may be shown on the map 32. The VP cursor 34 may be a graphical representation of the vehicle 12 indicating a present location of the vehicle 10 on the map 32. Data 36 may be shown on the screen view 30 indicating a current street name where the VP cursor 34 is located. Other data such as a current time or a compass indicator may be shown on the screen view 30. If a route to a destination has been calculated, the calculated route may be highlighted. The navigation system 12 may be dynamic such that as the vehicle 10 moves, the graphical representation of the map 32 and the position of the VP cursor 34 on the map 32 may be updated.

Figure 4:
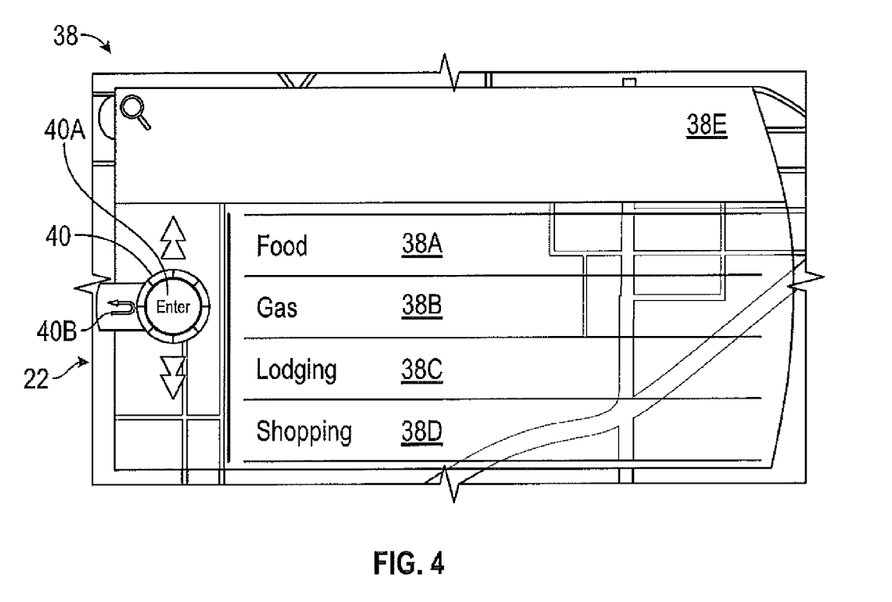
FIG. 4 shows one embodiment of an illustrative menu screen generated by the exemplary navigation system depicted in FIG. 1 in accordance with one aspect of the present application.

If the user would like to perform a search for different types of POIs that may be located near the VP cursor 34, the user may enter search criteria through the user interface 20. In accordance with one embodiment, by using the user interface 20, a menu screen 38 may be seen on the display 22 as shown in FIG. 4. The menu screen 38 may have pre-defined search criteria for selected types of POIs. As shown in FIG. 4, the menu screen 38 may have POI categories for food 38A, gas 38B, lodging 38C, and shopping 38D. Other POI categories may be shown on the menu screen 38 other than those shown in FIG. 4. By selecting one of the listed POI categories shown on the menu screen 38, POIs that meet the pre-defined search criteria of the selected POI category may be shown and/or listed as will be described below. One or more of the POI categories may have one or more sub-categories. The sub-categories may list different divisions of the POIs categories. For example, if the user selected the POI category for food 38A, one or more sub-categories may be displayed showing different types of food categories such as American food, Asian food, Mexican food, as well as other food types. Alternatively, the sub-categories may be listed based on customer reviews, or ratings. In the above example, if the user selected the POI category for food 38A, one or more sub-categories may be displayed for five star restaurants, four star restaurants, three star restaurants, two star restaurants, one star restaurants and no star restaurants. The above are given as examples. The POI categories may be divided into other sub-categories than those listed above.

A search area 38E may be shown on the menu screen 38. The search area 38E may be used to enter user selected search criteria. The user may enter keywords, addresses or other search criteria in the search area 38E through the user interface 20. The navigation system 12 may be configured to find POIs that match the search criteria entered. For example, if the user wanted to search for coffee houses, the user may enter "coffee" through the user interface 20 in the search area 38E. The navigation system 12 may locate POIs that match the search criteria for "coffee".

In the embodiment shown in FIG. 4, a scroll button 40 may appear on the display 22. The scroll button 40 may be a touch screen button on the display 22 which may allow the user to navigate through the menu screen 38. By using the scroll button 40, the user may go through the different POI categories that may be listed on the menu screen 38. By using the "Enter" button 40A, the user may select one of the listed POI categories shown on the menu screen 38 or to search for POIs that match the search criteria entered in the search area 38E.

Figure 5:
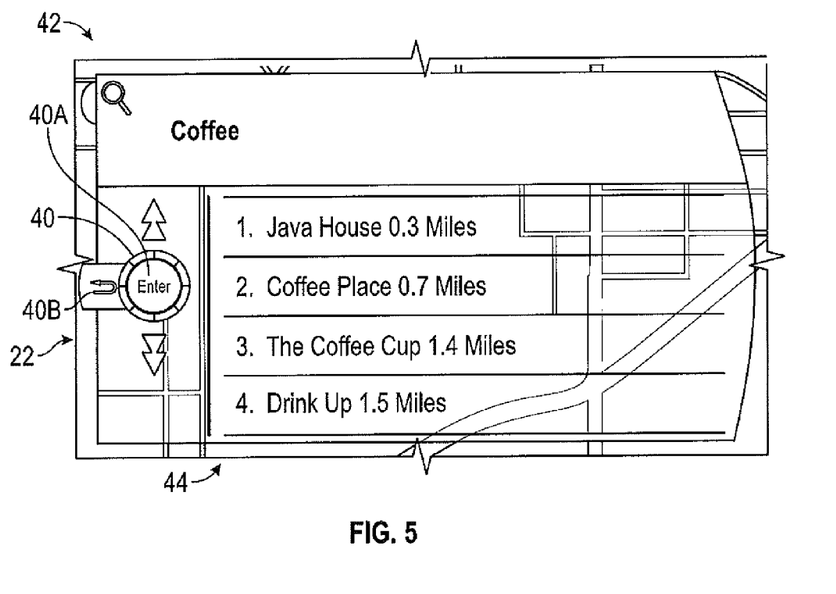
FIG. 5 shows one embodiment of an illustrative POI list screen generated by the exemplary navigation system depicted in FIG. 1 in accordance with one aspect of the present application.

Referring to FIG. 5, when the user has entered the POI search criteria, a screen 42 showing a POI list 44 may be displayed. The POI list 44 may show POIs that match the search criteria entered. The POIs on the POI list 44 may be listed in different manners. In the embodiment shown in FIG. 5, the POIs on the POI list 44 may be displayed based on the distance from the POI to the current location of the vehicle 12 with the closest POI listed first and the furthest POI listed last. The POIs on the POI list 44 may be listed in other manners such as alphabetically, customer rating, or other listing manners. While four POIs may be shown on the POI list 44 in FIG. 5, any number of POIs that meet the search criteria may be listed. The user may scroll through the POIs on the POI list 44 using the user interface 20 and/or the scroll button 40.

In order to limit the number of POIs listed, the navigation system 12 may be configured to list the POIs that meet the search criteria and are within a predetermined distance of the current location of the vehicle 10. Thus, in the example where the user wanted to search for coffee houses, all coffee houses within a predetermined radius of the vehicle 10 may be listed. Alternatively, the number of POIs listed may be limited to those POIs that meet the search criteria as well as within a predetermined boundary defined by the map 32. Thus, in the example where the user wanted to search for coffee houses, all coffee houses located within the boundary of the map 32 may be listed. In accordance with one embodiment, the map may be set at a default map scale. Alternatively, a user may increase or decrease a magnification level of the map 32. Thus, the number of POIs listed may change based on the magnification level of the map 32 being shown on the display 22. In accordance with one embodiment, if the vehicle 10 is moving, the navigation system 12 may limit the number of POIs on the POT list 44. The navigation system 12 may limit the number of POIs on the POI list 44 to a predetermined number of POIs that match the search criteria and are closest to the vehicle 12. In accordance with one embodiment, the navigation system 12 may limit the number of POIs on the POI list 44 to the closeted eight POIs that match the search criteria.

Figure 6:
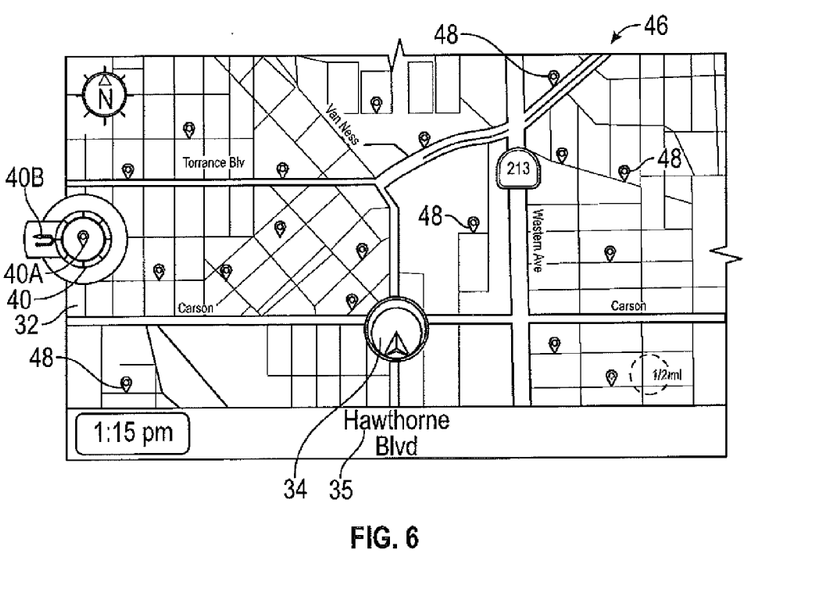
FIG. 6 shows one embodiment of an illustrative POI map screen generated by the exemplary navigation system depicted in FIG. 1 in accordance with one aspect of the present application.

The user may switch from the screen 42 showing the POI list 44 to a POI map screen 46 shown in FIG. 6. The user may use the user interface 20 and/or the scroll button 40 to switch from the screen 42 to the POI map screen 46. The POI map screen 46 may show the location of each of the POIs on the POI list 44 that meet the search criteria. Markers or pins 48 (hereinafter pins 48) may be used to show the location of each POI on the map 32. The navigation system 12 may be configured to allow the user to move/scroll to a user selected pin 46. The scroll button 40 and/or the user interface 20 may be used to allow the user to navigate a position on the map 32 to a user selected pin 46. In accordance with one embodiment, the map 32 may move to the next pin 46 in the user selected direction. If the user continues to press the scroll button 40 and/or the user interface 20 in the same direction, the map 32 may continue to move to the next successive pin 46 in the user selected direction. The movement of the map 32 may stop when there are no more pins 46 in the user selected direction. Alternatively, the map 32 may return to the first pin 46 closest to the cursor 34 in the user selected direction.

In accordance with one embodiment, the map 32 may be divided into a plurality of sections 50. Each section 50 may correspond to a direction in which the scroll button 40 may move the map 32. Thus, if the scroll button 40 is a touch screen 8-way scroll button, the map 32 may be divided into eight different sections wherein each section may correspond to one of the eight different directions the scroll button 40 may move.

Figure 7:
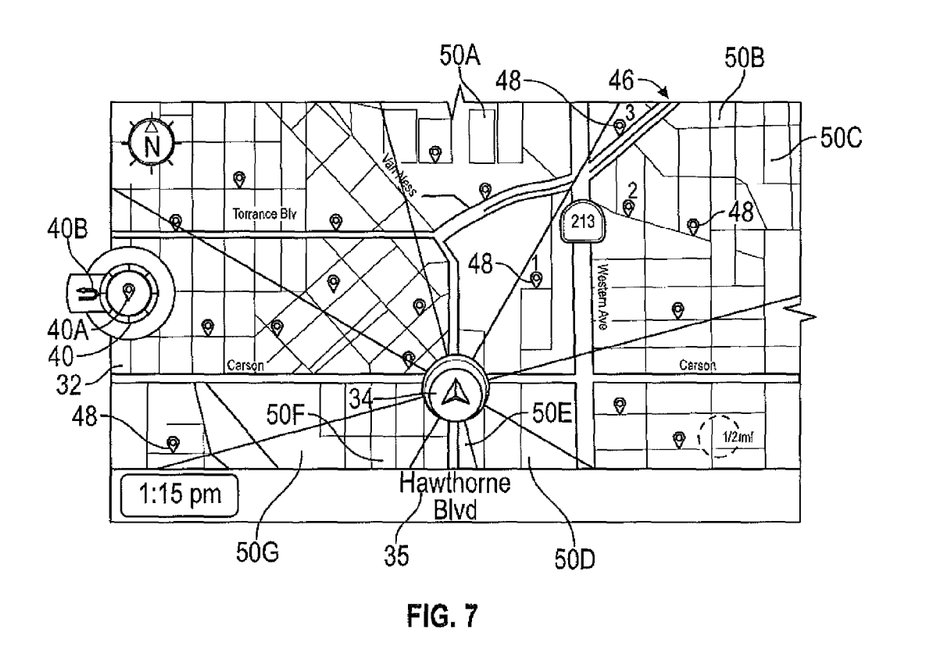
FIG. 7 shows the embodiment of the illustrative POI map screen depicted in FIG. 6 having the moving areas in accordance with one aspect of the present application.

As may be seen in FIG. 7, the map 32 may be divided into a plurality of sections. In the embodiment shown in FIG. 7, the map 32 may be divided into eight sections 50A-50H. Each section 50A-50H may correspond to one of the eight different directions in which the scroll button 40 may move. While the map 32 on FIG. 7, may show a plurality of lines dividing the map 32 into the eight sections 50A-50H, the lines are being shown for illustrative purposes.

If the user were to move the map in the direction corresponding to section 50B, the map 32 may move to the pin 46 labeled as 1 which is the $1^{st}$ pin 46 located closest to the VP cursor 34. If the user continues to move the map 32 in the direction corresponding to section 50B, the map 32 may then move to the next pin 46 labeled as 2 in section 50B which may be the $2^{nd}$ closest pin 46 to the VP cursor 34 in the direction corresponding to section 50B. If the user continues to move the map 32 in the direction corresponding to section 50B, the map 32 may continue to move to next successive pin 46 which may be the pin 46 labeled as 3 in section 50B. The movement of the map 32 may stop where there are no more pins 46 in section 50B.

Figure 8:
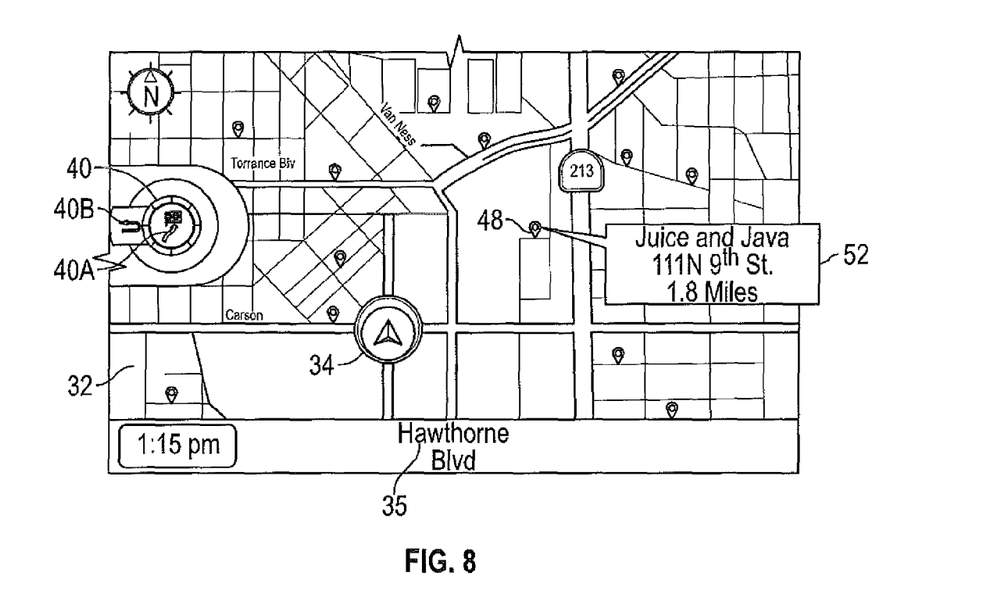
FIG. 8 shows one embodiment of an illustrative POI map screen generated by the exemplary navigation system depicted in FIG. 1 in accordance with one aspect of the present application.

When the user moves the map 32 to a pin 46, the location of the pin 46 may be centered on the map 32 as shown in FIG. 8. A bubble 52 may appear proximate the pin 46. The bubble 52 may have information related to the pin 46. For example, the bubble 52 may display a name and address of the POI associated with the pin 46. The bubble 52 may contain the distance from the VP cursor 34 to the pin 46. Other information such as a phone number or other information related to the POI associated with the pin 46 may be shown.

The user may select the pin 46 as a destination by using the button 40A or the user interface 20. If the pin 46 is selected as a destination, a route from the VP cursor 34 to the pin 46 may be shown on the map 32.

If at any time the user wishes to return back to a previous pin 46, the user may press a back button on the user interface 20. In accordance with the embodiment, the back button 40B may be a button located proximate the scroll button 40 that appears on the display 22. By pressing the back button 40B, the user may go to the previous pin 48 that the user just passed. For example, as shown in FIG. 7, if the user scrolls the map 32 to be positioned on the pin 48 labeled as 3, by pressing the back button 40B, the user may scroll the map 32 back to the pin 48 labeled as 2.

Figure 9:
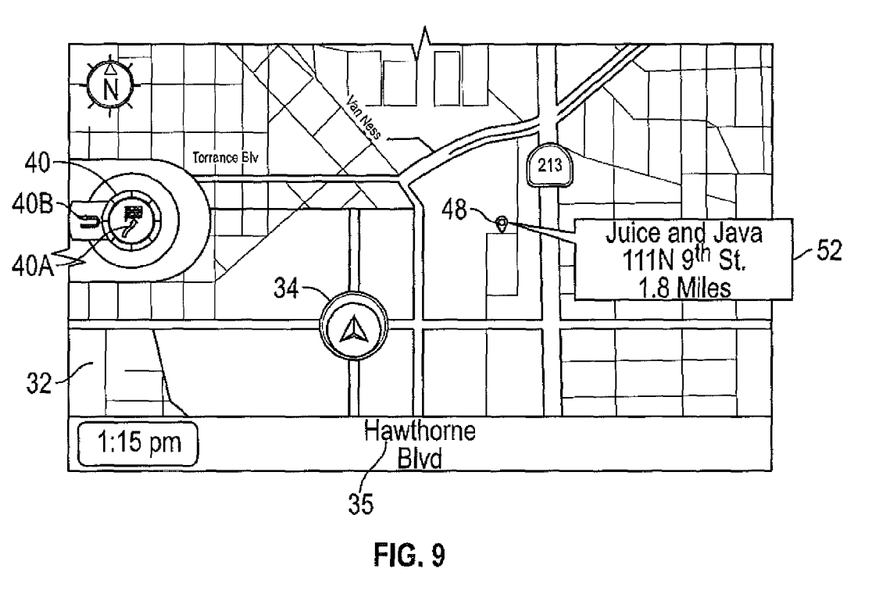
FIG. 9 shows one embodiment of an illustrative POI map screen generated by the exemplary navigation system depicted in FIG. 1 when the vehicle is moving in accordance with one aspect of the present application.

In accordance with one embodiment, if the vehicle 12 is moving and the screen 42 showing the POI list 44 is being displayed, the number of POIs on the POI list 44 may be reduced to a predetermined number. For example, the navigation system 12 may be configured to reduce the number of POIs on the POI list 44 to the eight closest POIs that meet the search criteria. The user may select one of the POIs on the POI list 44 using the user interface 20 and/or the scroll button 40. By selecting a POI on the POI list 44, the navigation system 12 may switch from the screen 42 showing the POI list 44 to a POI map screen 46' shown in FIG. 9. The POI map screen 46' may show a pin 48 indicating the location of the selected POI. Other pins 48 corresponding to the non-selected POIs on the POI list 44 may not be shown. A bubble 52 may appear proximate the pin 46. The bubble 52 may have information related to the pin 46. For example, the bubble 52 may display a name and address of the POI associated with the pin 46. The bubble 52 may contain the distance from the VP cursor 34 to the pin 46. Other information such as a phone number or other information related to the POI associated with the pin 46 may be shown.

If the user wanted to go back to the POI list 44, the user may press a back button on the user interface 20 or the back button 40B located primate the scroll button 40. By using the back button on the user interface 20 or the back button 40B, the navigation system 10 may go back to the screen 42 showing the POI list 44 where the user may select another POI on the POI list 44.

Referring now to FIGS. 1-10, a method of operation of the navigation system 12 may be disclosed. The method starts with a determination of a current location of the vehicle 10 as shown in block 60. A map 32 may be displayed showing the current location of the vehicle 12 as shown in block 62. If a user wishes to locate POIs near the current location of the vehicle 12, a user may enter a command for a menu screen 38 to appear as shown in block 64. The menu screen 38 may allow the user to enter and/or selected search criteria to find POIs that match the search criteria entered and/or selected. When search criteria has been entered and/or selected, a POI list 44 may be displayed as shown in block 66. A POI map screen 46 may be shown indicating the location of each POIs on the POI list 44 as shown in block 68. Pins 48 may be used to show the location of each POI on the POI map screen 46. The navigation system 12 may be configured to allow the user to move/scroll to a user selected pin 46 as shown in block 70. The scroll button 40 and/or the user interface 20 may be used to allow the user to navigate a position on the map 32 to a user selected pin 46. In accordance with one embodiment, the map 32 may move to the next pin 46 in the user selected direction. If the user continues to press the scroll button 40 and/or the user interface 20 in the same direction, the map 32 may continue to move to the next successive pin 46 in the user selected direction. The movement of the map 32 may stop when there are no more pins 46 in the user selected direction.

Figure 10:
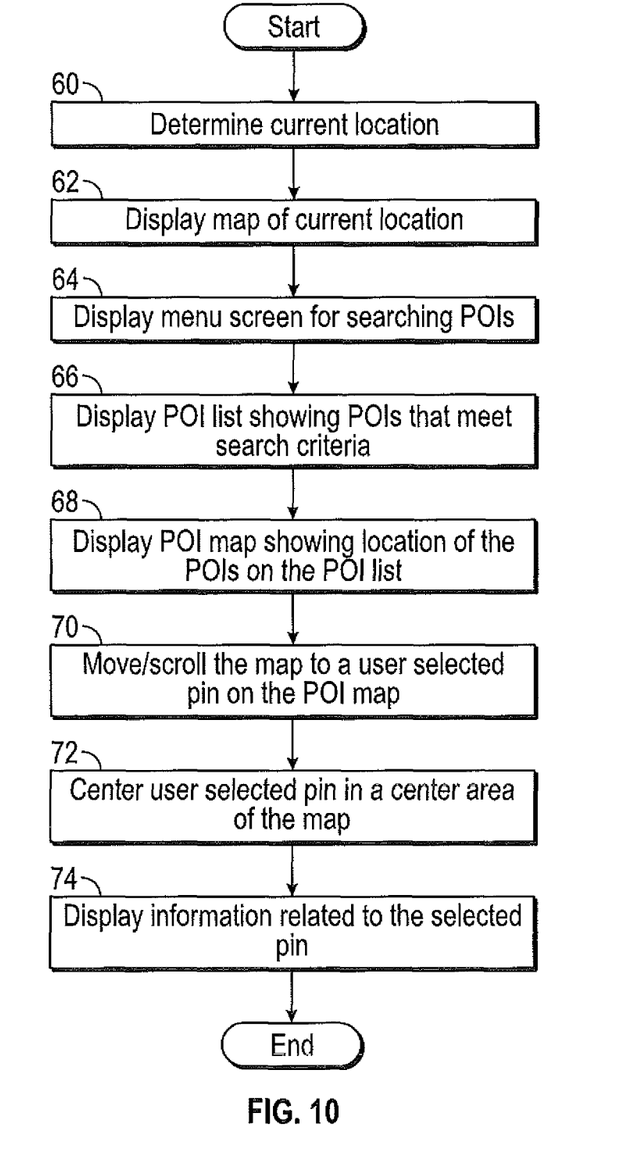
FIG. 10 is an exemplary flowchart depicting an illustrative method to allow a user to display different POIs on a map and to allow the user to move to a desired POI and provide details of the selected POI in accordance with one aspect of the present application.

When the user moves the map 32 to a pin 46, the location of the pin 46 may be centered on the map 32 as shown in block 72. A bubble 52 may appear proximate the pin 46 as shown in block 74. The bubble 52 may have information related to the pin 46. For example, the bubble 52 may display a name and address of the POI associated with the pin 46. The bubble 52 may contain the distance from the VP cursor 34 to the pin 46. Other information such as a phone number or other information related to the POI associated with the pin 46 may be shown.

The foregoing description is illustrative of particular embodiments of the application, but is not meant to be a limitation upon the practice thereof. The following claims, including all equivalents thereof, are intended to define the scope of the application.

What is claimed is:

1. A navigation system comprising:
   at least one processor; and
   a memory coupled to the processor, the memory storing program instructions that when executed by the processor, causes the processor to:
   display a map;
   display a cursor indicating a present location of a vehicle on the map;
   display a menu screen to enter a user selected point of interest (POI) search criteria;
   display a POI list showing POIs matching the user selected POI search criteria, wherein the POI list is limited to a predetermined number of POIs matching the user selected POI search criteria;
   display markings on the map to POIs matching the user selected POI search criteria;
   move the map to a user selected marking; and
   center the map on the user selected marking.

2. The navigation system, in accordance with claim 1, wherein the memory storing program instructions that when executed by the processor, causes the processor to display data in a text box proximate the user selected marking showing information related to the user selected marking.

3. The navigation system, in accordance with claim 1, wherein the POI list displays the POIs in order based on a distance from the present location of the vehicle to each respective POI.

4. The navigation system, in accordance with claim 1, wherein the memory storing program instructions that when executed by the processor, causes the processor to display a single marking on the map corresponding to a user selected POI from the POI list when the vehicle is moving, markings corresponding to non-selected POIs from the POI list removed from the map.

5. The navigation system, in accordance with claim 4, wherein the memory storing program instructions that when executed by the processor, causes the processor to display data in a text box proximate the single marking, the text box showing information related to the single marking.

6. The navigation system, in accordance with claim 1, wherein moving the map to a user selected marking comprises:
   moving to a first marking in a user selected direction, the first marking located closest to the cursor; and
   moving to successive markings in the user selected direction wherein each successive marking is further away from the cursor when the user continues to move the map.

7. A method of displaying point of interests (POIs) on a navigation system comprising:
   displaying a map;
   displaying a menu screen to enter user selected POI search criteria;
   displaying a POI list showing POIs matching the user selected POI search criteria, wherein the POI list is limited to a predetermined number of POIs matching the user selected POI search criteria;
   displaying markings on the map corresponding to POIs matching the user selected POI search criteria;
   moving the map to a user selected marking; and
   centering the map on the user selected marking.

8. The method of claim 7, further comprising displaying data in a text box proximate the user selected marking showing information related to the user selected marking.

9. The method of claim 7, further comprising displaying POIs on the POI list in order based on a distance from a present location of a vehicle having the navigation system to each respective POI.

10. The method of claim 7, further comprising displaying a single marking on the map corresponding to a user selected POI from the POI list when the vehicle is moving, markings corresponding to non-selected POIs from the POI list removed from the map.

11. The method of claim 10, further comprising displaying data in a text box proximate the single marking, the text box showing information related to the single marking.

12. The method of claim 7, wherein moving the map to a user selected marking comprises:
   moving to a first marking in a user selected direction, the first marking located closest to the cursor; and
   moving to successive markings in the user selected direction wherein each successive marking is further away from the cursor when the user continues to move the map.

13. A navigation system comprising:
   at least one processor; and
   a memory coupled to the processor, the memory storing program instructions that when executed by the processor, causes the processor to:
   display a map;
   display a menu screen to enter a user selected POI search criteria;
   display markings on the map corresponding to a POI matching the user selected POI search criteria;
   moving to a first marking in a user selected direction, the first marking located closest to the cursor;
   moving to successive markings In the user selected direction wherein each successive marking is further away from the cursor when the user continues to move the map; and
   center the map on the user selected marking.

14. The navigation system, in accordance with claim 13, wherein the memory storing program instructions that when executed by the processor, causes the processor to display a POI list showing POIs matching the user selected POI search criteria.

15. The navigation system, in accordance with claim 14, wherein the memory storing program instructions that when executed by the processor, causes the processor to display a single marking on the map corresponding to a user selected POI from the POI list when the vehicle is moving, markings corresponding to non-selected POIs from the POI list removed from the map.

16. The navigation system, in accordance with claim 14, wherein the POI list displays the POIs in order based on a distance from the present location of the vehicle to each respective POI.

17. The navigation system, in accordance with claim 14, wherein the POI list is limited to a predetermined number of POIs matching the user selected POI search.

18. The navigation system, in accordance with claim 16, wherein the POI list displays the POIs In order based on a distance from the present location of the vehicle to each respective POI.

19. The navigation system, in accordance with claim 15, wherein the memory storing program instructions that when executed by the processor, causes the processor to display data in a text box proximate the single marking, the text box showing information related to the single marking.

* * * * *